US006194991B1

(12) United States Patent
Barrs et al.

(10) Patent No.: US 6,194,991 B1
(45) Date of Patent: Feb. 27, 2001

(54) REMOTE KEYLESS ENTRY ROLLING CODE STORAGE METHOD

(75) Inventors: John A. Barrs, Farmington Hills; Thomas A. Lupinski, Garden City, both of MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/430,609

(22) Filed: Oct. 29, 1999

(51) Int. Cl.[7] .......... G06F 7/04

(52) U.S. Cl. .......... 340/5.72; 701/101; 701/115; 380/262; 307/10.2; 340/5.64; 340/5.61; 340/825.69

(58) Field of Search .......... 701/101, 102, 701/115; 340/825.69, 825.34, 5.61, 5.64, 5.72; 380/262, 264; 307/10.2, 10.4, 10.5

(56) References Cited

U.S. PATENT DOCUMENTS 5,369,706 * 11/1994 Latka .......... 380/23
5,506,905 * 4/1996 Markowski et al. .......... 380/25
5,646,996 * 7/1997 Latka .......... 380/21
5,767,784 * 6/1998 Khamharn .......... 340/825.34
5,862,225 * 1/1999 Feldman et al. .......... 380/48
5,937,065 * 8/1999 Simon et al. .......... 380/9
6,031,465 * 2/2000 Burgess .......... 340/825.69
6,130,622 * 10/2000 Hussey et al. .......... 340/542

* cited by examiner

*Primary Examiner*—Tony M. Argenbright
*Assistant Examiner*—Hieu T. Vo
(74) *Attorney, Agent, or Firm*—Niro, Scavone, Haller & Niro

(57) ABSTRACT

A remote keyless entry system stores critical data for synchronization in a plurality of memory locations at the receiver. When a transmission is received, the received data is validated using the critical data from a first memory location. In the event that the data in the first memory location is determined to be unusable, the critical data from a second memory location is used. The critical data is rewritten at the first memory location only if the transmission is ultimately determined to be valid.

20 Claims, 3 Drawing Sheets

54

| | | | |
|---|---|---|---|
| 56 | 11011 | | |
| 70 | 0000 0000 | 0000 0111 (=7) | 1101 1001 |
| 68 | 0000 0000 | 0000 0110 (=6) | 1101 1001 |
| 66 | 0000 0000 | 0000 0101 (=5) | 1101 1001 |
| 64 | 0000 0000 | 0000 0100 (=4) | 1101 1001 |
| 62 | 0000 0000 | 0000 0011 (=3) | 1101 1001 |
| 60 | 0000 0000 | 0000 1001 (=9) | 1101 1010 |
| 58 | 0000 0000 | 0000 1000 (=8) | 1101 1010 |

REMOTE KEYLESS ENTRY ROLLING CODE STORAGE METHOD

FIELD OF THE INVENTION

This invention relates to a robust method for the storage of critical data repeatedly received in transmission, such as the type of data received from an automatic key chain fob transmitter by a module within the automobile which opens the automobile door locks or trunk in response to transmissions from the fob.

BACKGROUND OF THE INVENTION

Systems for unlocking automobile doors and trunks include conventional keys, coded keypads on the automobile itself and lock systems which employ remote transmission, as for example from a key chain fob. While conventional keys and coded keypads may provide high security, many drivers today prefer to use fobs for their greater convenience. Such fobs generally include one or more pushbutton keys that, when pressed, cause the fob to emit a coded transmission including both an identification code for the particular fob and information to authorize the execution of a particular action, e.g. unlocking the automobile door. A control module on the automobile at which the fob is pointed picks up the coded transmission and decodes it. Such a control module constitutes, or is part of, the general electronic module (GEM) controlling the electrical system of the automobile and powered by the standard automobile battery. If the identification code in the transmission identifies the fob as one assigned to that automobile, the control module causes the electrical system of the automobile to execute the indicated action. As a result, the driver of the automobile can unlock the door as he or she approaches the automobile. Such lock systems are called keyless remote entry systems.

However, such lock systems which employ such remote transmissions are subject to security tampering because the surveillance and recording of the transmissions may also be carried out remotely, for example from another vehicle, without attracting any attention. Therefore, without any additional security measures, it would be possible for a thief to identify a desirable automobile, such as in a reserved workplace parking space which commonly contains more expensive cars, and then wait in a nearby automobile to record the fob transmission. The recorded fob transmission could then be used by the thief the next day, when the target automobile is again parked in the reserved space, to unlock the target automobile's door.

One solution to this problem is to require synchronization between the fob and the control module, that is, to change the coded transmission by a particular method with each transmission and then to have the control module permit the execution of the action only if a currently received transmission is determined to have changed from a previously received, authorized transmission in accordance with that particular method. This can prevent the thief from reusing a recorded transmission, since it would not have been appropriately changed. If the synchronization change and/or the code upon which it is based is made sufficiently complex, this method also can effectively prevent a thief from unlocking the door by simply broadcasting huge volumes of random numbers in the hope of accidentally hitting on the right number.

Many different systems for synchronization are known. All such systems must meet a number of restraints other than providing security. These include cost and convenience criteria, which limit the complexity and size of the codes being processed to those that can be handled by relatively low-cost processors. Another restraint is that the entire processing must require less than one second in order to be acceptable to the consumer. Still another restraint is imposed by a maximum size and weight of the fob, which can limit the size and sophistication of the processor.

In addition, it is common for more than one fob to be assigned or mated to each automobile, so that more than one driver can have his own. Generally four fobs are mated, although of course other numbers are possible. The synchronization system must accommodate use by any or all of the mated fobs from time to time.

However, an important restraint is that the holder of a mated fob not be locked out, or in other words it is important for customer satisfaction that the synchronization system not lose synchronization easily. While ways are known to provide for secure resynchronization by the owner of a mated fob, such as by depressing a combination of buttons on the fob, it is still highly undesirable for the sake of customer satisfaction to have to perform this process often. Moreover, without resynchronization, the fob would be permanently inoperative.

One method of synchronization uses a rolling count, also called a rolling code, contained in each transmission. With each button push, the rolling count is incremented. In order for a current transmission to be determined to authorize action, the rolling count must be greater than the rolling count of the previously received transmission. In such case, a recorded transmission from a thief, having a rolling count no greater than the most recent previous transmission, would be rejected. This method then requires that at least the rolling count from the previous valid transmission be recorded in the control module, for example in an EEPROM (electrically eraseable programmable read only memory) provided in the control module. An EEPROM is an example of a non-volatile memory, and it should hold the rolling count even if there is a loss of power. However, should this recorded rolling count become corrupted or inaccessible, either at the time it is written or thereafter, the comparison of the received rolling count and the recorded rolling count will not be successful, and the fob will again become inoperative.

OBJECTS AND SUMMARY OF THE INVENTION

Accordingly, it is an object of the invention to provide a secure and convenient remote operating system for transmitting commands for taking action.

It is another object of the invention to provide a secure and convenient remote operating system that provides fault tolerance and robustness of software to the operation of storage of critical data to memory, and in particular to a non-volatile memory.

It is yet another object of the invention to provide a method of data storage that extends the use of a limited storage cycle memory.

It is still another object of the invention to provide a secure and convenient remote operating system in which a numerical trial breach of security requires, at a minimum, a prohibitively long time, rendering the automobile essentially secure to brute force numerical trial attack.

It is a further object of the invention to provide a secure and convenient remote operating system that minimizes the chance of loss of synchronization and permits rapid resynchronization.

In accordance with these and other objects, the present invention is generally directed to a method for validating synchronization between a first module and a second module, comprising the steps of initially storing a first code in a first memory location in the second module, initially providing a plurality of sync memory areas, other than the first memory area, in the second module, each of the sync memory areas being adapted to store a sync code and a copy of the first code, and transmitting a current transmission from the first module to the second module, the transmission including a first sync code. The method further comprises the steps, in the second module, of receiving the current transmission from the first module, identifying a first one of the sync memory areas as storing a copy of the first code and a second sync code received from the first module in a first previous transmission, determining whether or not the second sync code is usable by determining whether the first code stored in the first memory area corresponds to the copy of the first code stored in the first sync memory area, and, if the second sync code is determined to be usable, determining whether or not the first and second modules are in synchronization based on the first sync code received in the current transmission and the second sync code stored in the first sync memory area. If the second sync code is determined not to be usable, the method identifies a second one of the sync memory areas as storing a third sync code received from the first module in a second previous transmission, determines whether or not the first and second modules are in synchronization based on the first sync code received in the current transmission and the third sync code stored in the second sync memory area. If the first and second modules are determined to be in synchronization, the method writes the first sync code and another copy of the first code in a selected one of the sync memory areas.

The invention is also directed to a system including the first and second modules.

The invention is further more specifically directed to a method for validating synchronization between a fob and a control module of a vehicle to authorize commands sent from the fob to the control module. The method comprises the steps of initially storing a master key code in a master key code area of the control module, initially providing a plurality of sync memory areas, other than the master key code area, in the control module, each of the sync memory areas being adapted to store a sync code and a copy of the master key code, and transmitting a current transmission from the fob to the control module, the transmission including a first sync code. The method further comprises the steps, in the control module, of receiving the current transmission from the fob, identifying a first one of the sync memory areas as storing a copy of the master key code and a second sync code received from the fob in a first previous transmission, determining whether or not the second sync code is usable by determining whether the master key code stored in the master key code area corresponds to the copy of the master key code stored in the first sync memory area, and, if the second sync code is determined to be usable, determining whether or not the fob and the control module are in synchronization based on the first sync code received in the current transmission and the second sync code stored in the first sync memory area. The method further comprises the steps of, if the second sync code is determined not to be usable, identifying a second one of the sync memory areas as storing a third sync code received from the fob in a second previous transmission, and determining whether or not the fob and the control module are in synchronization based on the first sync code received in the current transmission and the third sync code stored in the second sync memory area; and, if the fob and the control module are determined to be in synchronization, writing the first sync code and another copy of the master key code from the master key code area in a selected one of the sync memory areas.

These and other objects, features and advantages of the invention will become more apparent from the following detailed description of exemplary embodiments thereof, as illustrated in the accompanying drawings.

DETAILED DESCRIPTION OF THE PREFERRED EMBODIMENTS

Figure 1:
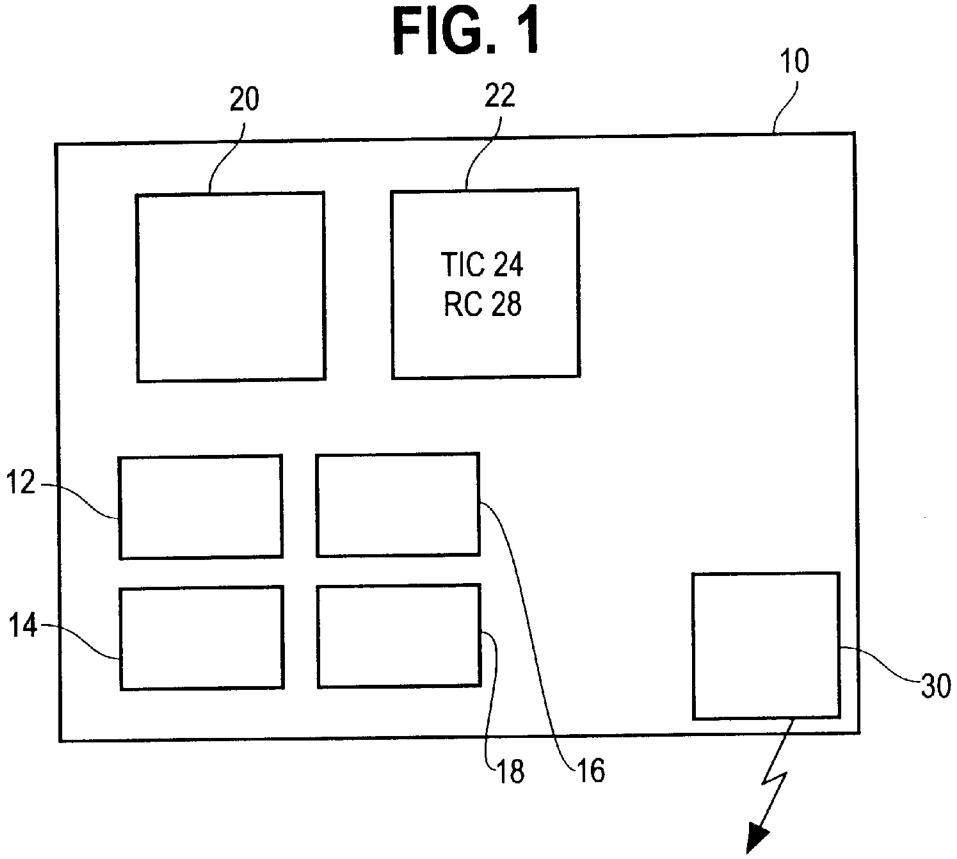
FIG. 1 is a stylized, simplified block diagram of a transmitter according to a preferred embodiment of the present invention.
Figure 2:
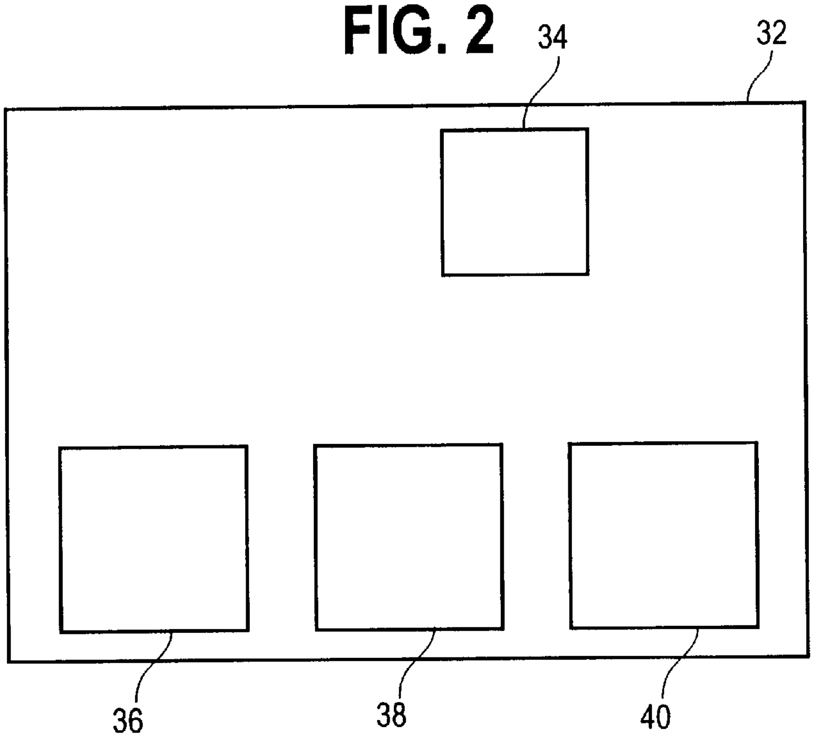
FIG. 2 is a stylized, simplified block diagram of a receiver according to the preferred embodiment.

One example of the present invention is its use in a remote, encrypted automobile door and trunk locking and unlocking mechanism. The mechanism includes a transmitter in the form of a fob 10, as shown in FIG. 1, and a receiver, in the form of a control module 32 on an automobile (not illustrated), as shown in FIG. 2. The commands to perform a certain task, such as a lock-related command (lock or unlock the doors, release the trunk), or to operate the lights and the horn or other alarm on the automobile in the event of a panic situation, or any other such command, are under the control of a plurality of buttons 12–18 on the fob 10. These buttons 12–18 may be tactile or touch-type switches and feed a processor, for example a microprocessor 20, which is associated with a writable memory, for example EEPROM 22. Upon manufacture, the fob 10 will be programmed so as to establish relevant information for generating and encoding data to form the command transmissions to the control module 32.

In particular, the fob 10 is programmed to store at least a transmitter identifier code (TIC) 24 and an initial value of a rolling count 28. The TIC 24 uniquely identifies this fob 10, and may consist of, for example, a 32 bit identification number. The rolling count 28 may consist of a 16 bit number, and is incremented each time one of the buttons 12–18 is pushed. For example, if the rolling count 28 is 16 bits and is incremented by 1 at each push, it will cycle from 0 to 65,535 and then start again at 0. This large number makes it effectively impossible for a thief to generate the right rolling count, as discussed below, merely by standing near the automobile and repeatedly pushing the buttons 12–18. Any thief will also be effectively prevented by the present invention from generating the right rolling count by recording and retransmitting a transmission, or by recording, modifying and retransmitting a transmission.

Upon the depression of one of the buttons 12–18, the microprocessor 20 in the fob 10 executes a control program to generate the appropriate transmission. For example, upon the depression of button 12 for unlocking the automobile door, the microprocessor 20 reads out the TIC 24 and rolling count 28 from the EEPROM 22 and encrypts the TIC 24 and rolling count 28 in combination with information identifying the particular command, i.e. to unlock the door. The encrypted data is then sent by a suitable transmitter 30, e.g. a conventional RF or infrared transmitter, as a transmission to be received by the control module 32. The structure and operation of the fob 10 in preparing and encrypting this transmission and in ensuring that the rolling count is incremented, for example by 1, at each button push may be achieved in any of a variety of conventional ways and do not form part of the present invention.

As shown in FIG. 2, the control module 32 includes an appropriate receiver 34 for receiving the transmission. Control module 32 also includes a processor, such as microprocessor 36, a first writable memory, such as EEPROM 38, and a second writable memory, such as RAM 40, which may include a PAGEO RAM. At the time of mating the fob 10 to the control module 32, the same values of the TIC 24 of fob 10 and the initial value of the rolling count 28 as recorded in the fob 10 are also recorded in the EEPROM 38 of the control module 32. As indicated above, a plurality of fobs, for example four, may all be mated to the same control module 32. Each of these other fobs will have its own TIC and its own initial value of the rolling count 28 stored therein. As each fob is mated to the control module 32, its TIC and initial value of the rolling count will be recorded in the EEPROM 38 of the control module 32.

In addition, at the time of mating, the control module generates a master key 26 for the fob being mated and stores the master key 26 in two locations in its memory. Each master key 26 advantageously consists of 5 bits, but cannot have a value equal to all bit positions equal to 1 or all equal to 0. This prevents the master key 26 from looking like erased information. The master key 26 for each fob is stored in a first location, at which it is never rewritten, and at a plurality of second locations respectively corresponding to prior valid transmissions. A comparison of the unchanging master key at the first location with a master key stored at a second location will serve as a check as to whether other data at the second location, specifically the rolling count thereat, is usable or corrupt, as will be discussed below.

Figure 3:
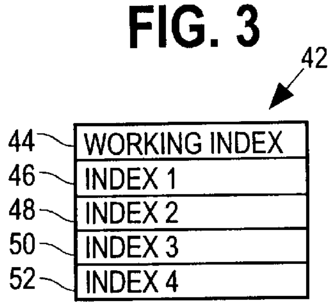
FIG. 3 is a first memory structure used in the receiver of FIG. 2 in accordance with the present invention.

In order to keep track of which of the four fobs is issuing a currently received transmission, the control module 32 identifies a respective stack area with each TIC 24. This stack area, constituting a first memory structure, stores indices which identify corresponding locations within another stack, constituting a second memory structure, for reading out a previously stored rolling count for comparison with a currently received rolling count and for writing in the currently received rolling count when the transmission from the respective fob is determined to be valid. As shown in FIG. 3, the first memory structure is advantageously embodied in an index block 42 in RAM 40 consisting of a first memory area 44 for holding a working index and four memory areas 46–52 for respectively storing one of the four indices. During the mating process, the TIC of the first fob to be mated is associated with Index 1, the TIC of the second fob to be mated is associated with Index 2, and so on. The indices contain pointers for identifying from where, in the second memory structure, data is to be read.

Figure 4:
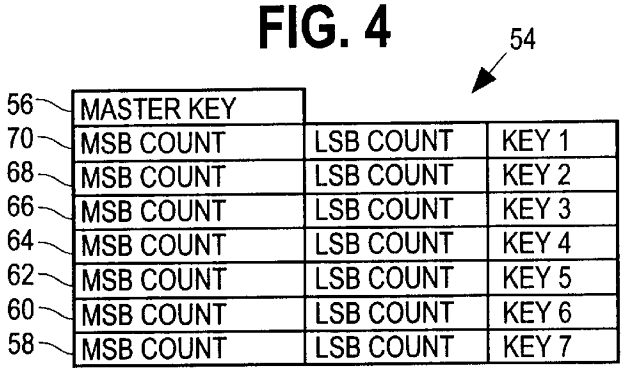
FIG. 4 is a second memory structure used in the receiver of FIG. 2 in accordance with the present invention.

The control module 32 also stores a second memory structure for each of the four indices. Each such second memory structure consists of a rolling count memory stack 54 in the EEPROM 38. As shown in FIG. 4, each stack 54 includes a master key memory area 56 and a plurality of rolling count memory areas. In the preferred embodiment, seven rolling count memory areas 58–70 are provided, although of course a different plurality may be provided. Each master key memory area 56 consists of one byte storing the master key 26 for the respective fob, and corresponds to the first memory location at which the master key is never rewritten. Each rolling count memory area 58–70 consists of three bytes, where the first and second bytes store the upper 8 bits (MSB) and the lower 8 bits (LSB) of the most recently stored 16 bit rolling count for this index. Thus, since the rolling count is a code used for synchronization, the rolling count memory areas may be considered sync memory areas. The third byte in each rolling count memory area 58–70 stores a copy of the 5 bit master key and a 3 bit pass key code. The pass key code indicates the number of the pass through the stack 54 at which the corresponding stored rolling count was written.

Figure 5:
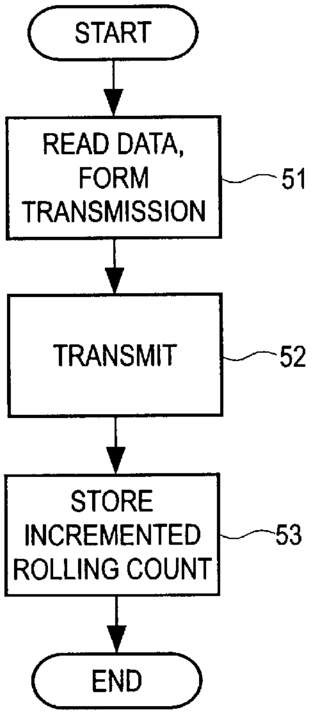
FIG. 5 is a logic flow diagram of a transmission operation of the transmitter of FIG. 1 in accordance with the present invention.
Figures 6, 7:
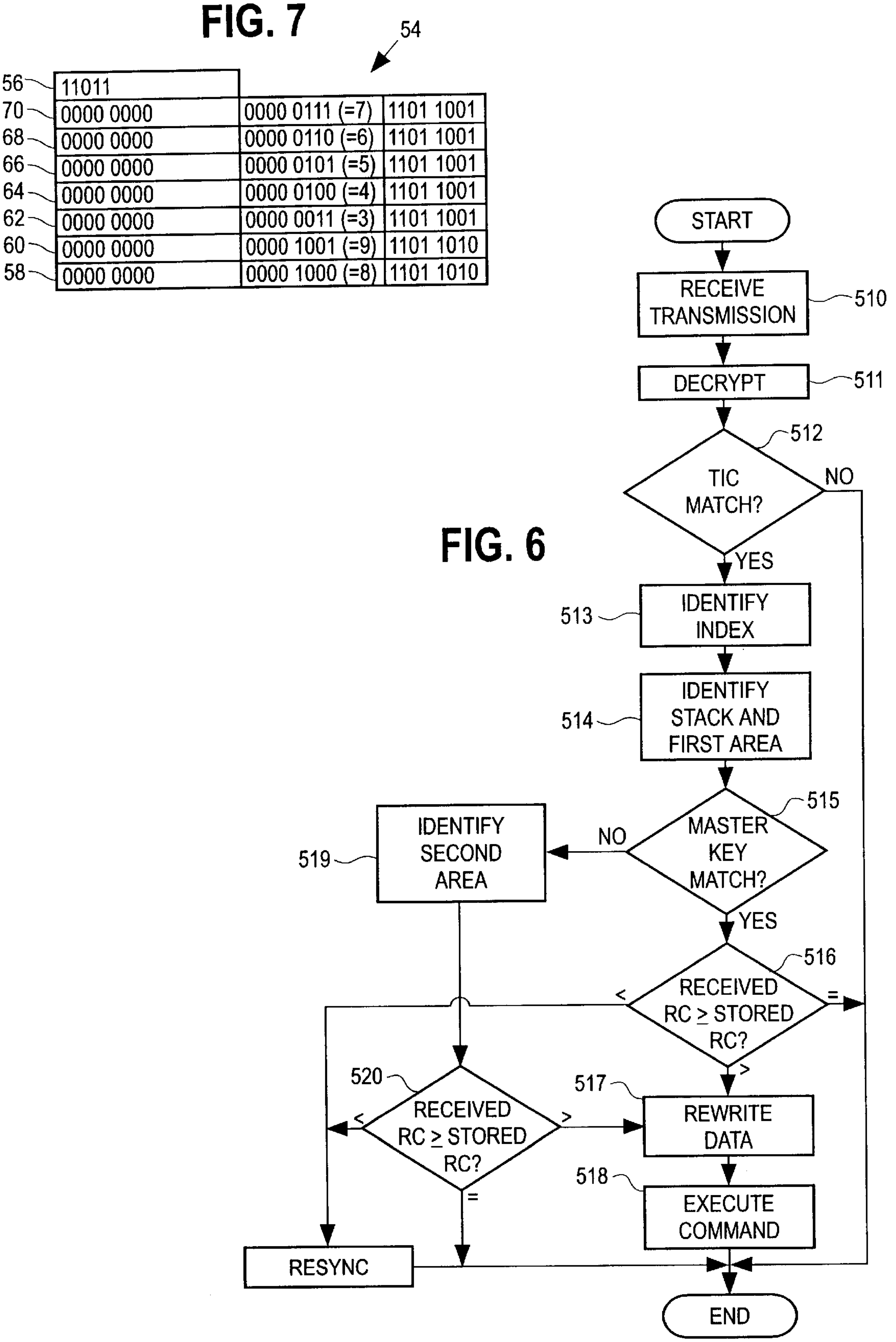
FIG. 6 is a logic flow diagram of a reception/synchronization operation of the receiver of FIG. 2 in accordance with the present invention.
FIG. 7 is an example of the second memory structure of FIG. 2 after the receiver has been in use.

The operation of the mated fob 10 and control panel 32 is illustrated by the flow diagrams of FIGS. 5 and 6. FIG. 5 shows the operational flow in the fob 10. It is assumed that the microprocessor 20 is the type which has a stop mode in which its clock does not run and the only function that the microprocessor 20 can perform is to respond to an external interrupt, which corresponds to depression of one of the buttons 12–18. This keeps power consumption extremely low and permits a battery of the fob 10 to last for years. Upon the start of the flow at the interrupt, the process begins at step S1, wherein the TIC and the rolling count are read out and assembled and encrypted into the appropriate transmission for the command corresponding to the depressed button. In step S2, the transmission is sent out, advantageously for a plurality of times with the same rolling count so that the control module 32 has an increased opportunity to correctly receive the transmission. Then in step S3 an incremented rolling count is stored, and the process ends by placing the microprocessor 20 back in its stop mode. This process of fob 10 is conventional and therefore will not be further described.

The operation of the control module 32 in receiving and processing the transmission is illustrated in FIG. 6. As shown therein, the process begins in step S10 when a transmission is received from fob 10, and in step S11 the transmission is decrypted to yield the received TIC, the received rolling count and whatever information is used to identify the desired command. Steps 10 and S11 are also conventional, corresponding respectively to steps S2 and S1, and will not be further described.

The received TIC is then used in conjunction with the index and stack, block 42 shown in FIG. 3 to identify which of the four mated fobs has issued the transmission and to identify its index. Let it be assumed that fob 10 was previously assigned Index 1 in the mating process. In step S12, the received TIC is compared to the four stored TICs to determined whether it matches with one, here the stored TIC for fob 10. If a match is found, the received TIC is determined to be valid, the user and his respective rolling count memory stack 54 are identified, and the process proceeds to step S13. If the received TIC does not match any of the stored TICs, it is determined that the received transmission did not come from a mated fob, and the process ends. This step is also conventional and will not be further described.

In step S13, the valid TIC is used to identify the index for this fob, i.e. Index 1, and this index is loaded into the working index position 44. In step S14, Index 1 in the working index position 44 is used to identify from which memory location of the identified rolling count memory stack 54 the stored rolling count is to be read. This is advantageously achieved by a pointer within each index identifying the one of the rolling count memory areas 58–70 that was written into the last time that a valid transmission was received from this particular fob.

In step S15, the master key at master key memory area 56 is compared with the stored copy of the master key from the identified rolling count memory area. If and only if the master key at area 56 and the stored copy of the master key match will the stored rolling count be read out from this rolling count memory area. This is a check to see whether the data at the identified rolling count memory area is corrupt, which may have occurred during the writing process or thereafter, as discussed below. If the two master keys match, it is determined that the data is not corrupt, and the process proceeds to step S16.

In step S16, the stored rolling count is read out of the identified rolling count memory area and compared with the received rolling count. It will be recalled that the identified rolling count memory area is the one written to the last time that a valid transmission was received from fob 10. Accordingly, this rolling count memory area will contain the rolling count of that previous valid transmission. Any subsequent transmission from fob 10 due to a subsequent button push, e.g. the current transmission now being analyzed, will have a rolling count that is greater than the rolling count of the previous valid transmission. Therefore, the process determines whether or not the received rolling count is greater than the read out rolling count. Since a button on the fob 10 may have been pushed at a time when the transmission was not received by the control module 32, for example by a child playing with the fob 10, the check is merely whether the received rolling count is greater, not whether it is greater by 1. If the received rolling count is greater, then it is determined that the transmission was from a mated fob, i.e. fob 10, and is valid, action upon the received command is authorized and the process proceeds to step S17. It is to be noted that if the received rolling count is $2^{16}-1$ ahead, this is the same as being 1 behind. Accordingly, as a further check, if the difference between the transmitted rolling count and the received rolling count exceeds a threshold, even though the transmitted rolling count is greater, the transmission may be deemed invalid. The difference is therefore calculated in 16 bit unsigned math.

As noted above, the fob 10 transmits the transmission a number of times each time a button 12–18 is depressed, to increase the likelihood that at least one of these transmissions will be received. It is therefore necessary, once the transmission has been properly received once, to block the subsequent transmissions with the same rolling count. To this end, the control module 32 updates the rolling count to equal the received rolling count, updates the index by 1, and stores the updated rolling count at the new location identified by the updated index. When a further transmission from the same button push or from a recorded transmission comes in, its rolling count will be less than or equal to the updated rolling count, and therefore will not be considered.

Thus, in step S17, the microprocessor 34 rewrites the data in the identified rolling count memory area. Specifically, first the first byte of the received rolling count is written into the first byte of the memory area, then the second byte of the received rolling count is written into the second byte of the memory area, and lastly a new copy of the master key from master key memory area 56 is written into the first 5 bits of the third byte, and the current pass key is written into the final three bits of the third byte. The index for fob 10 is updated by 1 and stored in memory area 46. Only if the transmission has been determined to be valid is any of this data rewritten. Then in step 18 the command is executed, and the process ends.

Alternatively, the received rolling count can be stored in RAM 40, for example in PAGEO RAM, for comparison to a newly received rolling count without even accessing the EEPROM 38.

If the data at a rolling count memory area is corrupted, so that the rolling count thereat is unreliable, it is most likely that the corruption occurred during this rewriting process, for example due to a brief power out. Since the master key is rewritten after the rolling count is rewritten, it can be safely presumed that if the master key is accurate then the rolling count is accurate. Also, by never rewriting the master key 26 held in the master key memory area 56, and thereby never permitting this master key to be corrupted during rewriting, the copies of the master key in the rolling count memory areas can be checked with confidence.

On the other hand, it may be determined in step S16 that the received rolling count is not greater than the read out rolling count, but rather is less than or equal to the read out rolling count. If the two counts are equal, the transmission is invalid as corresponding to a repeat transmission for the same button push or to a recorded transmission. If the received rolling count is less than the read out rolling count, this situation is considered to correspond generally to an out of sync condition. In such case, or if the two rolling counts are equal, or if the difference between rolling counts exceeds the threshold, the transmission is rejected as invalid, the data in the identified rolling count memory area is not rewritten and the command is not executed.

Returning now to step S15, if the two master keys do not match, the data in this rolling count memory area, including the rolling count stored therein, is assumed to be corrupt and therefore untrustworthy. In conventional systems, this would result in the transmission being rejected and the process would end. This created a problem, in that this failure happened too often for customer satisfaction. Accordingly, the present invention solves this problem by providing backup storage of the rolling count from at least one more previous valid transmission that can be accessed in case the data from the most recent valid transmission is unuseable.

Thus, if the copy of the master key stored in the third byte of the rolling count memory area for the most recent valid transmission is determined to be corrupt in step S15, the process of the present invention proceeds to step S19 to identify a second rolling count memory area from which to read the rolling count. Advantageously, the second identified rolling count memory area is the one which was written in response to the valid transmission immediately preceding the most recent valid transmission, although other earlier valid transmissions might be chosen. For this second attempt to validate the rolling count, the copy of the master key at the second rolling count memory area is not checked, but rather the process directly reads out the rolling count and compares it with the received rolling count in step S20. If the failure of the first attempt to validate was due to corruption of the data in the first identified rolling count memory area, then the data in the second identified rolling count memory are should be usable. In such case, if the transmission was from fob 10, the received rolling count will be greater than the second read out rolling count, and the transmission is validated. The process then goes to step S17 to complete the rewriting and command execution. Advantageously, the received rolling count, the new copy of the master key and the pass key are rewritten into the rolling count memory area following the first identified rolling count memory area and the index is updated. Accordingly, on the next pass, the corrupt data will be overwritten. As a result of this process in accordance with the present invention, the fob 10 remains more functional and the driver is locked out fewer times, leading to improved customer satisfaction.

However, if step S20 determines that the received rolling count is less than the second read out rolling count, the process determines that the fob 10 and the control module 32 are in an out of sync condition. This is assumed to be due to a fault in the fob 10, and the process then branches to a separate resynchronizing procedure in step S21. Such resynchronizing procedures are conventional, with, for example, different algorithms depending on the size of the difference between the two rolling counts, and will therefore not be further described.

The process for validating transmissions from the other mated fobs is identical, using the respective index and the respective rolling count memory stack 54.

While one fallback step has been used in this embodiment, it is of course possible to have as many fallback steps with master key checking as desired, up to the number of rolling count memory areas, if increased robustness is intended.

FIG. 7 gives an example of the contents of the identified rolling count stack 54 for fob 10 during operation. In this embodiment, the rolling count memory areas are written in the order 58 to 70, i.e. from the bottom of the stack up, although other orders are possible. The contents of rolling stack 54 show that 9 valid transmissions have occurred, resulting in one complete pass and one partial pass through the stack. Thus, the first two bytes of memory areas 62–70 record the rolling counts for transmissions numbers 3–7, with the last three bits of the third byte indicating that this is pass 1 through the stack. However, memory areas 58 and 60, which had previously held the data for transmissions numbers 1 and 2 in pass 1 have now been rewritten to hold the data for transmissions numbers 8 and 9 in pass 2. As a result, Index 1 would include a pointer pointing to memory area 60 as holding data for the most recent valid transmission. Should the validation process for memory area 60 fail in step S15 with the two master keys failing to match, the process would fall back to identify memory area 58 to check the rolling count therein.

FIG. 7 presents the contents as though all transmissions were received and determined to be valid, so that the rolling counts are strictly in sequence. Of course, there may be gaps in the sequence, for example in the case of a transmission that was not received, so that the stored rolling counts might skip from 5 to 7, or 5 to 70 or more. This creates no problem, since the data is only written for valid transmissions and the rolling count check accommodates such gaps, as noted above.

The pass key code is used in the event of a power loss when the indices in index block 42 in RAM 40 are lost. In such case, the location before the location where the pass key code changes to a lower number, e.g., memory area 60, is identified as the location last written into, and the new index is set thereto. If all pass key codes in a stack are the same, then the top memory area 70 is identified.

Thus, the present invention provides the same level of security found in the conventional rolling count synchronization schemes, while at the same time providing increased customer satisfaction by reducing the instances of lockout of a mated fob.

While the invention has been described for fob system for remotely keying a control module in an automobile, it will be understood that the invention is applicable to many other applications which combine the need for security in the transmission of information with the desire to avoid unnecessary lockouts. This would include, for example, any other type of locking system on other structures, or other systems wherein a command is to be executed only upon the determination that it was received from an authorized source. Furthermore, while the invention has been described in terms of a physically separate fob and control module, there is no requirement that the transmitting module be physically separate from the receiving module. In such case, the terms transmitting and receiving would more generally correspond to outputting and inputting, by any wireless or wired means.

Moreover, while the invention is advantageously embodied in software in the processor of the GEM of an automobile, those skilled in the art will recognize that the invention could be equivalently embodied in hardware or in a combination of hardware and software.

Although the invention has been shown and described with respect to exemplary embodiments thereof, it should be understood by those skilled in the art that the description is exemplary rather than limiting in nature, and that many changes, additions and omissions are possible without departing from the scope and spirit of the present invention, which should be determined from the following claims.

We claim:

1. A system comprising first and second modules, wherein said first module comprises:

a first memory in said second module for initially storing a first code; and a transmitter for transmitting a current transmission from said first module to said second module, the transmission including a first sync code, and said second module comprising:

a second memory initially providing a plurality of sync memory areas, each of said sync memory areas being adapted to store a sync code and a copy of the first code;

a receiver for receiving the current transmission from said first module;

identifying means for identifying a first one of said sync memory areas as storing a copy of the first code and a second sync code received from said first module in a first previous transmission;

first determining means for determining whether or not the second sync code is usable by determining whether the first code stored in said first memory corresponds to the copy of the first code stored in said first sync memory area;

second determining means for, if the second sync code is determined to be usable, determining whether or not said first and second modules are in synchronization based on the first sync code received in the current transmission and the second sync code stored in said first sync memory area, wherein, if the second sync code is determined not to be usable, said identifying means identifies a second one of said sync memory areas as storing a third sync code received from said first module in a second previous transmission, and determining whether or not said first and second modules are in synchronization based on the first sync code received in the current transmission and the third sync code stored in said second sync memory area; and writing means for, if said first and second modules are determined to be in synchronization, writing the first sync code and another copy of the first code from said first memory in a selected one of said sync memory areas.

2. The system of claim 1, wherein said first module is a fob and said second module is a control module on an automobile.

3. A method for validating synchronization between a first module and a second module, comprising the steps of:

initially storing a first code in a first memory area in the second module;

initially providing a plurality of sync memory areas, other than the first memory area, in the second module, each of the sync memory areas being adapted to store a sync code and a copy of the first code; and transmitting a current transmission from the first module to the second module, the transmission including a first sync code, said method further comprising the steps, in the second module, of:

receiving the current transmission from the first module;

identifying a first one of the sync memory areas as storing a copy of the first code and a second sync code received from the first module in a first previous transmission;

determining whether or not the second sync code is usable by determining whether the first code stored in the first memory area corresponds to the copy of the first code stored in the first sync memory area;

if the second sync code is determined to be usable, determining whether or not the first and second modules are in synchronization based on the first sync code received in the current transmission and the second sync code stored in the first sync memory area;

if the second sync code is determined not to be usable, identifying a second one of the sync memory areas as storing a third sync code received from the first module in a second previous transmission, and determining whether or not the first and second modules are in synchronization based on the first sync code received in the current transmission and the third sync code stored in the second sync memory area; and if the first and second modules are determined to be in synchronization, writing the first sync code and another copy of the first code in a selected one of the sync memory areas.

4. The method of claim 3, wherein the sync codes are rolling count codes, and wherein said method determines that the first and second modules are in synchronization when the first sync code received in the current transmission is greater than the respective stored sync code in the respective determining step.

5. The method of claim 4, wherein the first previous transmission is a valid transmission occurring next previously to the current transmission, and the second previous transmission is a valid transmission occurring next previously to the first previous transmission.

6. The method of claim 3, wherein said method determines that the second sync code is useable if the first code stored in the first memory area is identical to the copy of the first code stored in the first sync memory area.

7. The method of claim 3, further comprising a resynchronization process initiated if the first and second modules are determined not to be in synchronization based on the first sync code and the third sync code.

8. The method of claim 3, wherein a plurality of identical first modules are provided mated to the second module, and said method is used to determine synchronization between the second module and any of the first modules.

9. The method of claim 8, wherein each of the first modules stores a respective identifier code different from the other identifier codes, the second module stores all of the identifier codes, and each transmission includes the identifier code of the transmitting first module, said method further comprising the steps, occurring in the second module before said step of identifying a first one of the sync memory areas, of:

determining whether or not a received transmission is from one of the mated first modules by determining whether an identifier code in the received transmission matches one of the identifier codes stored in the second module; and terminating said method if there is no match.

10. The method of claim 9, wherein the second module stores a respective plurality of sync memory areas for each first module, and said method identifies a corresponding one of the pluralities of sync memory areas based upon a match between the identifier code in the received transmission and one of the stored identifier codes.

11. The method of claim 3, wherein the sync memory area selected to be written into is a sync memory area following the first sync memory area.

12. A method for validating synchronization between a fob and a control module of a vehicle to authorize commands sent from the fob to the control module, said method comprising the steps of:

initially storing a master key code in a master key code area of the control module;

initially providing a plurality of sync memory areas, other than the master key code area, in the control module, each of the sync memory areas being adapted to store a sync code and a copy of the master key code; and transmitting a current transmission from the fob to the control module, the transmission including a first sync code, said method further comprising the steps, in the control module, of:

receiving the current transmission from the fob;

identifying a first one of the sync memory areas as storing a copy of the master key code and a second sync code received from the fob in a first previous transmission;

determining whether or not the second sync code is usable by determining whether the master key code stored in the master key code area corresponds to the copy of the master key code stored in the first sync memory area;

if the second sync code is determined to be usable, determining whether or not the fob and the control module are in synchronization based on the first sync code received in the current transmission and the second sync code stored in the first sync memory area;

if the second sync code is determined not to be usable, identifying a second one of the sync memory areas as storing a third sync code received from the fob in a second previous transmission, and determining whether or not the fob and the control module are in synchronization based on the first sync code received in the current transmission and the third sync code stored in the second sync memory area; and if the fob and the control module are determined to be in synchronization, writing the first sync code and another copy of the master key code from the master key code area in a selected one of the sync memory areas.

13. The method of claim 12, wherein the sync codes are rolling count codes, and wherein said method determines that the fob and the control module are in synchronization when the first sync code received in the current transmission is greater than the respective stored sync code in the respective determining step.

14. The method of claim 13, wherein the first previous transmission is a valid transmission occurring next previously to the current transmission, and the second previous transmission is a valid transmission occurring next previously to the first previous transmission.

15. The method of claim 12, wherein said method determines that the second sync code is useable if the master key code stored in the master key code area is identical to the copy of the master code stored in the first sync memory area.

16. The method of claim 12, further comprising a resynchronization process initiated if the fob and the control module are determined not to be in synchronization based on the first sync code and the third sync code.

17. The method of claim 12, wherein a plurality of identical fobs are provided mated to the control module, and said method is used to determine synchronization between the second module and any of the fobs.

18. The method of claim 17, wherein each of the fobs stores a respective identifier code different from the other identifier codes, the control module stores all of the identifier codes, and each transmission includes the identifier code of the transmitting fob, said method further comprising the steps, occurring in the control module before said step of identifying a first one of the sync memory areas, of:

determining whether or not a received transmission is from one of the mated fobs by determining whether an identifier code in the received transmission matches one of the identifier codes stored in the control module; and terminating said method if there is no match.

19. The method of claim 18, wherein the control module stores a respective plurality of sync memory areas for each fob, and said method identifies a corresponding one of the pluralities of sync memory areas based upon a match between the identifier code in the received transmission and one of the stored identifier codes.

20. The method of claim 12, wherein the sync memory area selected to be written into is a sync memory area following the first sync memory area.

* * * * *